United States Patent Office 3,337,264
Patented Aug. 22, 1967

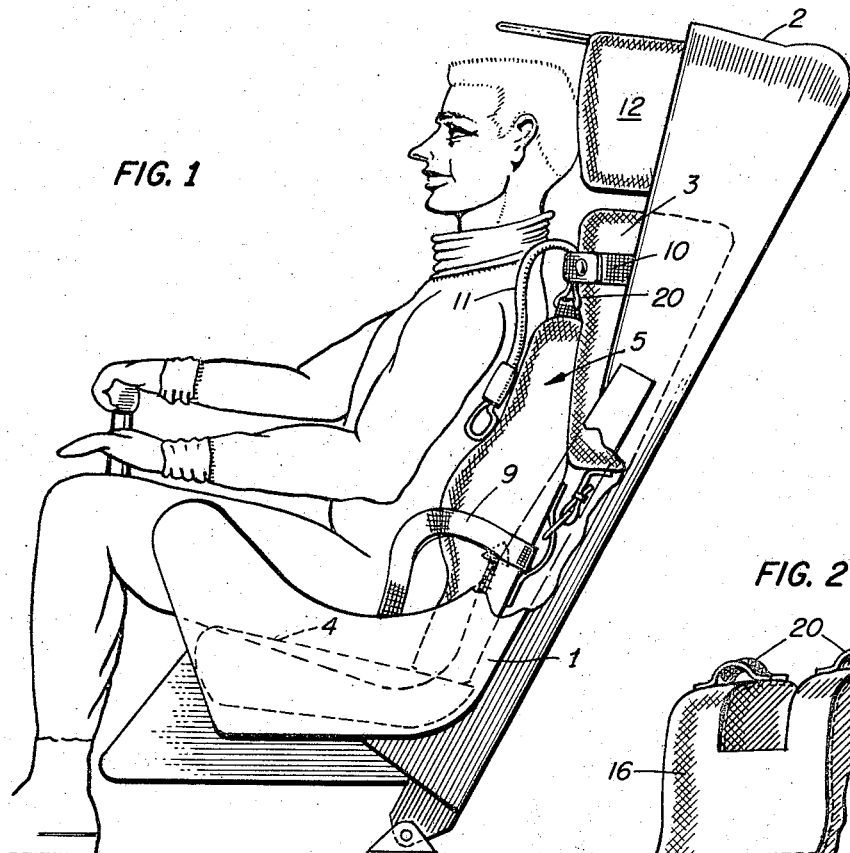
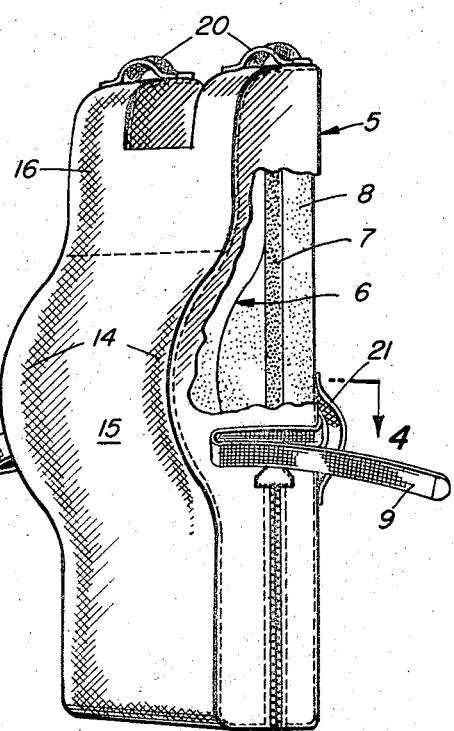
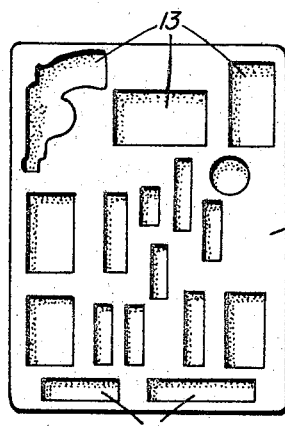
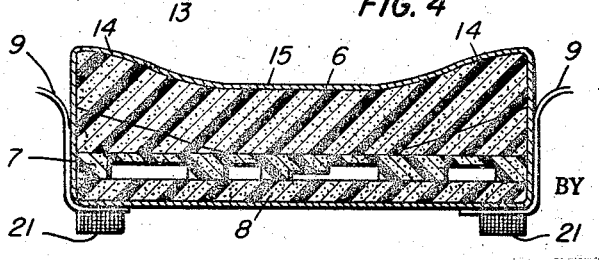
INVENTOR
LLOYD R. COLLINS
VERNON C. TUCKER
ATTORNEY

3,337,264
LUMBAR PAD FOR AIRCRAFT
EJECTION SEATS
Lloyd R. Collins, Godfrey, Ill., and Vernon C. Tucker, Bridgeton, Mo., assignors, by mesne assignments, to the United States of America as represented by the Secretary of the Navy
Filed Apr. 25, 1966, Ser. No. 546,139
4 Claims. (Cl. 297—191)

ABSTRACT OF THE DISCLOSURE

A self-supporting emergency kit-lumbar pad for application to the back of an aircraft ejection seat to provide cushioning and lateral support for the user and to further provide a storage for survival equipment while strapped to the user's back. The pad comprises a forward-ply having protuberances thereon for cradling the lumbar region of the user's body, an intermediate-ply having cavities therein for receiving survival items, and an aft-ply.

This invention relates to aircraft ejection seat accessories and more particularly to a lumbar pad or cushion designed to both supplment the supporting action of ejection seat backs and to provide easy access to the pilot's survival equipment.

Ejection seats in modern jet aircraft are normally provided with a container or compartment mounted to the upper part of the seat adapted to contain and support the airman's parachute pack while the latter is carried behind his back attached to his harness. The container with the parachute pack partially forms a back rest for the airman which during long missions, tends to bring about much discomfort and undue fatigue since it is not designed specifically for comfort.

In attempting to secure maximum ease and comfort for the user in flight, a back pad has been heretofore provided which cushions the seat thereby supplementing the back rest which the parachute pack normally provided. Such a pad, however, fails to relax the user and to properly position him in his seat because it is generally of constant cross-section throughout its width.

In addition to inadequate cushioning, firearms and extensive survival equipment, normally belt-attached to the user's body, or carried in pockets in the region of his waist, only enhance the user's discomfort during long missions.

Accordingly, it is an object of this invention to provide a lumbar pad or back rest for the aircraft seat which is contoured to properly fit the user's back and which provides an accessible storage area for survival equipment.

Another object of this invention is to provide a lumbar pad strapped to the user during flight, during ejection, for example, and upon landing, and which remains with the user after his parachute is discarded whereby easy access to his survival paraphernalia is maintained.

Another object of this invention is to provide a pad for application to an ejection seat back which pad is designed to relieve some of the strain on the pilot's back accompanying long flight and escape from the aircraft by being provided with means thereon for cradling the lumbar region of the pilot's body during flight.

A still further object of this invention is to provide a lumbar pad composed of a multi-ply stuffing such as a foam plastic, for example, wherein the intermediate-ply is shaped to accommodate the elements of a survival kit, said ply also acting as a rigid foam backing and the forward portion being a soft, flexible cushion formed from one or more plys.

Other objects, advantages and novel features of the invention will become apparent from the following detailed description of the invention when considered in conjunction with the accompanying drawings wherein:

FIG. 1 is a side view showing the lumber pad positioned in an aircraft seat partly broken away to show straps for securing the pad to the seat;

FIG. 2 is a view of the lumbar pad with its cushion stuffing partly exposed;

FIG. 3 shows the intermediate-ply cushion stuffing which accommodates the user's survival package; and FIG. 4 is a cross-sectional view of the pad taken at line 4—4 of FIG. 2.

Referring to the drawings, the main parachute assembly 3 comprises a parachute packed in a cloth container secured within the compartment or pad 2 which is part of seat 1 shown for illustrative purposes only. The parachute pack is wedge-shaped and is mounted between similarly shaped side members of compartment 2 near the top of the seat frame behind the user and this pack serves partially as a back support with member 12 serving, for example, as a head rest. Means 10 is provided for picking up shoulder straps 11 which are subsequently laced through straps 20. In this way the pad may be secured to the seat via the parachute pack. At the bottom of the pack, additional straps may be attached which, when engaged with straps 21 as shown in FIG. 1, ensure that the lumbar pad is securely attached to the seat. These strap means are illustrative only, it being understood that various alternative means for effectuating the pad-to-seat attachment may be employed.

The lumbar pad 5 of the instant invention is placed in the seat with its top end in partly overlapping relationship with parachute assembly 3 and with its bottom end resting upon the occupant-supporting bottom 4.

As an alternative, straps 9 may be provided on the pad which are attached to the user's waist when the pad is used as a survival container, thereby allowing the pad to be independently secured to his back.

In FIG. 2, the lumbar pad 5 is shown contained in a casing 16 such as canvas, leather, or other suitable material, with a zipper attached for easy access to the cushioning which is composed of replaceable open-celled and semi-rigid celled materials. For example, the cushioning stuffing may be composed of a three-ply stuffing wherein forward-ply 6 is an open-celled sheet of molded polyurethane or any flexible foam plastic, molded or hand shaped, which supplies comfort and cushioning to the user. The aft-ply 8 is also of open-celled urethane foam. Intermediate-ply 7 of the pad is a semi-rigid sheet of Koroseal, or any thermoplastic composition, which controls the shape of and affords rigidity to the cushion. This ply, shown in detail in FIG. 3, is of a polyvinyl chloride rigid foam or any substituted lightweight closed cell rigid foam plastic, and may be constructed to contain recessed and encapsulated survival items such as a pistol, snake-bite serum, insect repellent, K rations, radio transmitter, hand-grenade, medical supplies, sunburn ointment, compass, life raft and any other items normally found in such survival packages. Only cavities 13 are shown in FIG. 3 for receiving these survival items.

Each sheet of the three-ply stuffing may be adhesively secured to one another along their abutting faces in any conventional manner such that a unitary and self-supporting pad is produced.

A horizontal, intermediate portion 14 of forward-ply 6 is made of substantially greater thickness at its sides as compared to the upper and lower horizontal portions, as best shown in FIG. 4, the front wall of this intermediate portion at opposite sides thereof forming a vertically concave protuberance. These protuberances jointly form a horizontally concave portion therebetween to generally fit the lumbar region of the user, at either side of the small of the back and therefore act to cradle that portion of the user's body. This protuberant and subsequently concave portion of the pad is located approximately at the vertical center of the pad and directly therebeneath, the flat front face of the pad merges with the valley portion 15 between the side protuberances 14. Forward-ply 6, which is generally of constant cross-section throughout, is thickened, as hereinabove noted, by inserting strips (see FIG. 4) of flexible foam plastic between it and intermediate-ply 7 along the sides of the pad. As an alternative, a molded single piece of open celled urethane foam contoured into the shape of the sacro-lumbar-dorsal spine can be used as forward-ply 6.

The pad, due to its unique design, properly positions the man in the seat contour for safety, support and comfort thereby permitting the pilot, for example, to have better control of the aircraft. Also, the pad lends vertebral support to the pilot's back, and because of its portability, standardizes the vertical and horizontal adjustment of the seat for the take-off, flying and landing sequence. Furthermore, during escape from the aircraft in an ejection seat, the pilot's upper torso has been heretofore free to twist and swing from side to side as the seat is ejected. The pad of the instant invention, with its contoured design, obviates this possibility by providing adequate back support for sustaining ejection loads. And, comfort is provided during long missions thereby enhancing relaxed alertness needed to react quickly to any hazardous condition.

During use, the lumbar pad is secured to the seat by means of strap attachments 20 and 21 as heretofore described. When used as a comfort and support item in combination with an ejection seat, after ejection, seat 1 with the parachute container and the lumbar pad falls away from the user in the conventional manner before the chute is opened. When the lumbar pad is used to contain survival items in combination with an ejection seat, after ejection, seat 1 along with the parachute container falls away from the user in the conventional manner before the chute is opened. One end of each of the straps 20 and 21 is designed to permit the parachute container to become disengaged from the pad. The lumbar pad in this use is attached to the aircrewman in some fashion, as by straps 9, and remains with the aircrewman after the seat falls away and the parachute has opened. After landing, the user, with the lumbar pad in the survival configuration, discards his parachute and thereafter has easy access through the zipper casing to the survival equipment remaining strapped to his back.

From the foregoing, it is readily apparent that a lumbar pad has been invented which is simple and easy to manufacture yet vitally assists pilots and other users by providing comfort, adequate back support and an accessible storage area for survival equipment not heretofore available. Also, the device is capable of use to afford increased ease and comfort of posture on all kinds of seating devices, as for example, on automobile seats, office chairs, light aircraft seats, commercial pilot and passenger seats, and for seating orthopedic patients. Naturally, in the above alternative uses, no survival equipment is necessary.

Obviously many modifications and variations of the present invention are possible in light of the above teachings. It is therefore to be understood that within the scope of the appended claims the invention may be practiced otherwise than as specifically described.

What is claimed is:

1. A self-supporting, emergency kit, lumbar pad for application to the back of a seat to provide both cushioning and lateral support for the user in the seat, and to further provide a storage for survival equipment, said pad comprising:

a soft forward-ply of irregular cross-section having protuberances extending out of the plane of its forward face for cradling the lumbar region of the user's body;

a rigid intermediate-ply for controlling the shape of said pad, with its forward face abutting the aft face of said forward-ply and its aft face having a plurality of cavities therein shaped to snugly receive various survival items;

a soft aft-ply with its forward face abutting the aft face of said intermediate-ply;

a covering completely encasing the lumbar pad and having a slide fastener access means for providing easy access to the survival equipment through said fastener; and straps secured to said covering for independently securing the pad to the user, said covering being provided with detachable straps and the pad being received by the back portion of an aircraft ejection seat and, through said detachable straps, being secured to the container of a parachute in the seat, whereby, upon ejection, the seat and parachute container are capable of falling away from the user while the pad remains strapped to the user's back for easy access to the survival equipment upon landing.

2. The lumbar pad of claim 1 wherein said protuberances for cradling the lumbar region of the user's back are vertically convex and located on opposite sides of said forward-ply forward face thereby jointly forming a horizontally concave portion therebetween and positioned approximately at the vertical center of the pad.

3. The lumbar pad of claim 1 wherein said forward-ply is composed of a flexible open-celled foam plastic.

4. The lumbar pad of claim 1 wherein said rigid intermediate-ply is composed of a closed cell polyvinyl chloride rigid thermoplastic foam composition.

References Cited

UNITED STATES PATENTS

| | | | |
|---|---|---|---|
| 2,293,530 | 8/1942 | Beehler | 297—191 |
| 2,404,109 | 7/1946 | Steele | 297—188 |
| 2,442,375 | 6/1948 | Paxton | 297—217 |
| 2,633,905 | 4/1953 | Geldbaugh | 297—191 |
| 2,929,587 | 3/1960 | Martin | 297—217 |
| 3,093,407 | 6/1963 | Wilson | 297—230 |
| 3,139,632 | 7/1964 | Johns | 5—341 |
| 3,197,255 | 7/1965 | Caudill | 297—230 |

FOREIGN PATENTS 741,786  12/1955  Great Britain.

FRANCIS K. ZUGEL, *Primary Examiner.*